(12) United States Patent
Cragun et al.

(10) Patent No.: US 7,752,542 B2
(45) Date of Patent: Jul. 6, 2010

(54) DYNAMIC EXTERNAL ENTITY RESOLUTION IN AN XML-BASED CONTENT MANAGEMENT SYSTEM

(75) Inventors: Brian J. Cragun, Rochester, MN (US); David G. Herbeck, Rochester, MN (US); John E. Petri, Lewiston, MN (US)

(73) Assignee: International Business Machines Corporation, Armonk, NY (US)

( * ) Notice: Subject to any disclaimer, the term of this patent is extended or adjusted under 35 U.S.C. 154(b) by 928 days.

(21) Appl. No.: 11/533,651

(22) Filed: Sep. 20, 2006

(65) Prior Publication Data

US 2008/0072138 A1 Mar. 20, 2008

(51) Int. Cl.
*G06F 17/30* (2006.01)

(52) U.S. Cl. .................. 715/236; 715/234; 715/235; 715/239; 715/248; 715/249; 707/1

(58) Field of Classification Search .......... 715/234, 715/236, 239, 248, 249
See application file for complete search history.

(56) References Cited

U.S. PATENT DOCUMENTS

| | | | | |
|---|---|---|---|---|
| 6,748,569 | B1* | 6/2004 | Brooke et al. | 715/207 |
| 6,763,343 | B1* | 7/2004 | Brooke et al. | 707/1 |
| 6,772,165 | B2* | 8/2004 | O'Carroll | 707/101 |
| 6,772,413 | B2* | 8/2004 | Kuznetsov | 717/136 |
| 7,124,357 | B1* | 10/2006 | Orr | 715/234 |
| 7,191,397 | B2* | 3/2007 | Brooke et al. | 715/239 |
| 7,334,126 | B1* | 2/2008 | Gilmore et al. | 713/168 |
| 7,483,983 | B1* | 1/2009 | Bonefas et al. | 709/226 |
| 2002/0156702 | A1* | 10/2002 | Kane | 705/27 |
| 2004/0210556 | A1* | 10/2004 | Brooke et al. | 707/1 |
| 2005/0086584 | A1* | 4/2005 | Sampathkumar et al. | 715/501.1 |
| 2005/0102281 | A1* | 5/2005 | Takahashi | 707/3 |
| 2005/0273772 | A1* | 12/2005 | Matsakis et al. | 717/136 |
| 2006/0095422 | A1* | 5/2006 | Kikuchi | 707/3 |
| 2007/0074106 | A1* | 3/2007 | Ardeleanu et al. | 715/513 |
| 2007/0226610 | A1* | 9/2007 | Da Silva et al. | 715/523 |
| 2008/0201328 | A1* | 8/2008 | Da Silva et al. | 707/6 |

\* cited by examiner

*Primary Examiner*—Doug Hutton
*Assistant Examiner*—Andrew R Dyer
(74) *Attorney, Agent, or Firm*—Patterson & Sheridan (57) ABSTRACT

Embodiments of the invention provide a method, system, and article of manufacture for dynamically resolving external entity references in a document managed by a content management system (CMS). In one embodiment, a wrapper transform may be applied to a source transform to generate a modified source transform. The modified source transform may be configured to generate resolvable external entity references when applied to a document being accessed from the CMS. The modified source transform may be applied to the document being checked out to generate an output document, and the output document may be returned in response to an access request.

20 Claims, 6 Drawing Sheets

FIG. 2

...
THIS DOCUMENT INCLUDES A <A Href = "../../DOCS/Test Resets"> Link</A> to test results...

FIG. 3A

THIS DOCUMENT INCLUDES A <a Href = "HTTP://www.server.com/ectd/Project/DOCS/testresults"> LINK </A> TO TEST RESULTS

DYNAMIC EXTERNAL ENTITY RESOLUTION IN AN XML-BASED CONTENT MANAGEMENT SYSTEM

BACKGROUND OF THE INVENTION

1. Field of the Invention

Embodiments of the invention are generally related to processing content stored in a Content Management System (CMS). More specifically, embodiments of the invention are related to dynamic external entity resolution in XML based content management systems.

2. Description of the Related Art

Content management systems (CMS) allow multiple users to share information. Generally, a CMS system allows users to create, modify, archive, search, and remove data objects from an organized repository. The data objects managed by a CMS may include documents, spreadsheets, database records, digital images and digital video sequences. A CMS typically includes tools for document publishing, format management, revision control, indexing, search and retrieval, among others.

Often, extensible markup language (XML) may be used by CMS systems to describe and store data objects (which themselves may be XML documents) managed by the CMS system. XML is a widely used standard for creating markup languages to describe the structure of data, and many organizations publish domain-specific XML grammars for specific datasets using a document type definition or XML schema. A document type definition (DTD) is used to provide a formal definition of the elements, structures, and rules for marking up a given type of XML document. In other words, a DTD provides a statement of rules specifying which elements (markup tags) and attributes (values associated with specific tags) are allowed in an XML document. XML schemas provide another mechanism that may be used to define XML document structure and limitations. XML Schemas are themselves XML documents. An XML schema references a standardized XML namespace and may include a collection of supporting DTDs as well.

Frequently, data objects managed by a CMS may contain links to other files or documents. To give an example from the pharmaceutical industry, the International Conference on Harmonization of Technical Requirements (ICH) has published an XML grammar for XML documents governing electronic drug submissions to the FDA (known as the eCTD—electronic common technical document). The eCTD includes a standard set of XSLTs (extensible stylesheet transformation language) used to transform XML documents into HTML web pages viewed in a browser. However, when eCTD XSLT transforms are used as-is to transform XML data stored in the CMS, these transforms make certain assumptions about the location of linked documents. Unfortunately, this often leads to transformed HTML output that contains incomplete or unresolveable links. Sometimes, this occurs because the data stored in the eCTD XSLT generates HTML links with relative paths. (i.e., a link to another document based on a current location, as opposed to an absolute location) These links function properly when all of the references are available and stored relative to the HTML file (for example on the same client system), but in the case of viewing an eCTD from a Web-based CMS, these relative references fail to resolve properly. More generally, "broken" or unresolveable references to external entities may occur whenever a standardized set of XML DTD's or XSLT transforms assume a particular operating environment, and the documents need to be used by individuals outside of the particular operating environment.

One approach to the problem is to package all of the documents referenced by a document being checked out with the document being checked out. In many cases however, particularly in regulated industries, one document may include hundreds, if not thousands of links to other documents. It is simply unrealistic to package thousands of associated documents with the HTML for online display.

Another approach to addressing this problem is to modify the XSLT to generate output documents with paths to content in the CMS. However, XSLT transforms are often created by third parties such as government agencies and other external bodies. Using the eCTD as an example, companies may wish to create documents according to the eCTD standard. In such a case, it is important that the XSLT transforms are not modified. For this reason, editing a standardized XSLT is generally not considered an acceptable solution to the problem. Further, this approach is difficult to maintain, as anytime the original XSLT transform is modified by the external organization, the "custom" XSLT transform may need to be modified as well. Thus, creating a parallel set of XSLT transforms is not a sustainable approach.

Still another approach to addressing the problem is to insert code into the data object to allow the client requesting the object to resolve any external entity references (e.g., HTML hyperlinks to other documents). For example, embedded Java Script could be used to rewrite links or other external entity references on the fly. However, this approach relies on a new set of assumptions about what the client program needs to be able to do, and these assumptions may not always be accurate. For instance it assumes the client can run Java Script, but if the client is not a web browser it is unlikely to be able to run Java Script. Given the assumptions that must be made this solution is also unworkable in many cases.

Accordingly, there remains a need in the art for a method to provide dynamic external entity resolution in an XML based content management system.

SUMMARY OF THE INVENTION

Embodiments of the present invention provide a means to dynamically alter a source transform (e.g., a standardized XSLT like ones provided by eCTD specification) before the source XSLT is applied to a document being accessed from a content management system (CMS). For example, users may perform operations such as checking out a document from the CMS, viewing a document in the CMS or exporting a document from the CMS. When the modified source transform is applied to the document being accessed, external entity references (e.g., hyperlinks) in the document being accessed may be rewritten to be resolvable.

One embodiment of the invention includes a method for providing dynamic external entity resolution in a content management system (CMS). The method generally includes receiving a request to access a document from the CMS, wherein the document is associated with at least one source transform. The method also includes applying a wrapper transform to the source transform to generate a modified source transform. The modified source transform may be configured to generate an output document with resolvable external entity references when applied to the document being accessed. The modified source transform may then be applied to the document being checked out to generate the output document, and the output document may be returned to a requesting application.

Another embodiment of the invention includes a computer-readable medium containing a program which, when executed, performs an operation for providing dynamic external entity resolution in a CMS. The operation generally includes receiving a request to access a document from the CMS, where the document is associated with at least one source transform. A wrapper transform may be applied to the source transform to generate a modified source transform. The modified source transform is configured to generate an output document with resolvable external entity references when applied to the document being accessed. The operation generally further includes applying the modified source transform to the document being checked out to generate an output document and returning the output document to a requesting application.

Still another embodiment includes a computing device having a processor and a memory containing a CMS configured to perform a method for providing dynamic external entity resolution. The CMS may be generally configured to receive a request to access a document from the CMS, wherein the document is associated with at least one source transform. In response, the CMS may be configured to apply a wrapper transform to the source transform to generate a modified source transform. The modified source transform is configured to generate an output document with resolvable external entity references when applied to the document being accessed. The CMS may be further configured to apply the modified source transform to the document being checked out to generate an output document and to return the output document to a requesting application.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Embodiments of the invention provide a method, system and article of manufacture for dynamically resolving external entity references in data objects managed by a content management system (CMS). In a particular embodiment, a wrapper transform (e.g., an extensible style sheet language transformation (XSLT)) may be used to dynamically modify a source transform so that the source transform will generate an output document with resolveable references when applied to a data object accessed from the CMS.

Further, multiple wrapper transforms may be used to create a "transformation pipeline" in the appropriate case. Still further, different wrapper XSLTs may be used depending on the application or individual accessing a document from the CMS. In one embodiment, the wrapper XSLT transform may be applied to the source XSLT transform before the source XSLT transform is applied to the requested data object. Generally, the source XSLT transform, as modified by the wrapper XSLT transform, may be configured to generate output documents with valid external entity references (e.g., hyperlinks) to resolvable CMS resources when a user accesses a data object (e.g., an XML document) managed by the CMS.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable media. Illustrative computer-readable media include, but are not limited to: (i) non-writable storage media (e.g., read-only memory devices within a computer such as CD-ROM or DVD-ROM disks readable by a CD- or DVD-ROM drive) on which information is permanently stored; (ii) writable storage media (e.g., floppy disks within a diskette drive or hard-disk drive) on which alterable information is stored. Other media include communications media through which information is conveyed to a computer, such as through a computer or telephone network, including wireless communications networks. The latter embodiment specifically includes transmitting information to/from the Internet and other networks. Such computer-readable media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

While embodiments of the invention are described relative to the widely used XML markup language, XML schemas, DTDs, and the XSLT transformation language, the invention is not limited to applications involving XML and embodiments of the invention may be adapted for use with other markup languages and transformation languages, whether now known or later developed.

Figure 1:
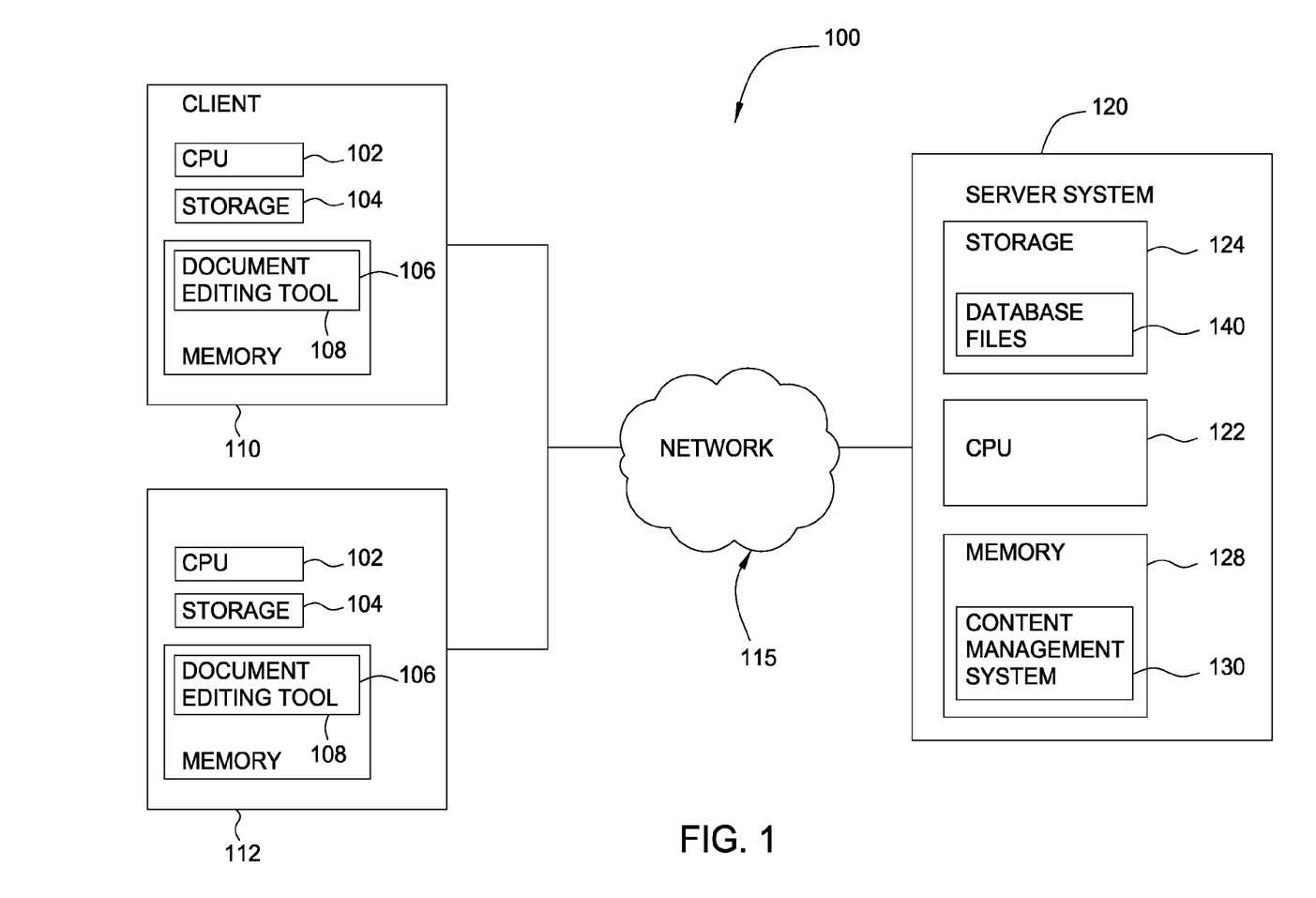
FIG. 1 is a block diagram illustrating a computing environment and content management system, according to one embodiment of the invention.

FIG. 1 is a block diagram illustrating a computing environment 100 and content management system 130, according to one embodiment of the invention. As shown, computing environment 100 includes two client computer systems 110 and 112, network 115, and server system 120. The computer systems 110, 112, and 120 illustrated in environment 100 are included to be representative of existing computer systems, e.g., desktop computers, server computers laptop computers, tablet computers and the like. However, embodiments of the invention are not limited to any particular computing system, application or network architecture, and may be adapted to take advantage of new computing systems as they become available. Additionally, those skilled in the art will recognize that the computer systems illustrated in FIG. 1 are simplified to highlight aspects of the present invention and that computing systems and networks typically include a variety of additional elements not shown in FIG. 1.

As shown, client computer systems 110 and 112 each include a CPU 102, storage 104, and memory 106, typically connected by a bus (not shown). CPU 102 is a programmable logic device that performs all the instructions, logic and mathematical processing performed in executing user applications (e.g., a query tool 108). Storage 104 stores application programs and data for use by client computer systems 110 and 112. Typical storage devices 104 include hard-disk drives, flash memory devices, optical media and the like. Network 115 generally represents any kind of data communications network. Accordingly, network 115 may represent both local and wide area networks, including the Internet.

Memory 106 of client computer systems 110 and 112 includes a client application/editing tool 108. In one embodiment, the editing tool 108 is software application that allows users to access information stored in a content management system (e.g., CMS 130). The client application 108 may be configured to allow users to create, edit, and save a data object, e.g., word-processing documents, spreadsheets, database records, digital images or video data objects. In one embodiment, the client application may be an internet browser configured to access CMS 130 using a distributed middleware application such as an application server or portal server. For example, the WebSphere® application server and Solution for Compliance in a Regulated Environment (SCORE) CMS system available from IBM® may be used to access and view portions of an eCTD document over network 115. Regardless of the function or document type client application 108 may allow users may to check-in and check-out, view, and export documents from CMS 130 running on server system 120, as well as to perform other document editing functions.

As shown, server system 120 includes a CPU 122, storage 124 and memory 128. Illustratively, storage 124 includes a database 140, and memory 128 includes CMS 130. As stated, CMS 130 may provide a system for creating, modifying, archiving and removing information resources from an organized repository (e.g., database files 140). Typically, CMS 130 includes tools used for publishing, format management, revision control, indexing, and search and retrieval of data objects stored by storage 124 and database 140. When a request to access content managed by CMS 130 is received, e.g., a document from the eCTD backbone, the requested document may be first transformed into an HTML document (or other output format) using one or more XSLT transforms. In some cases, the XSLT transform may be a part of a standardized collection such as the ones provided by the eCTD standard. In such a case, a wrapper transform may be used to dynamically modify the standard transform so that when it is applied to the requested document, any links or external entity references will function properly in the document transmitted to the requesting client application.

Figure 2:
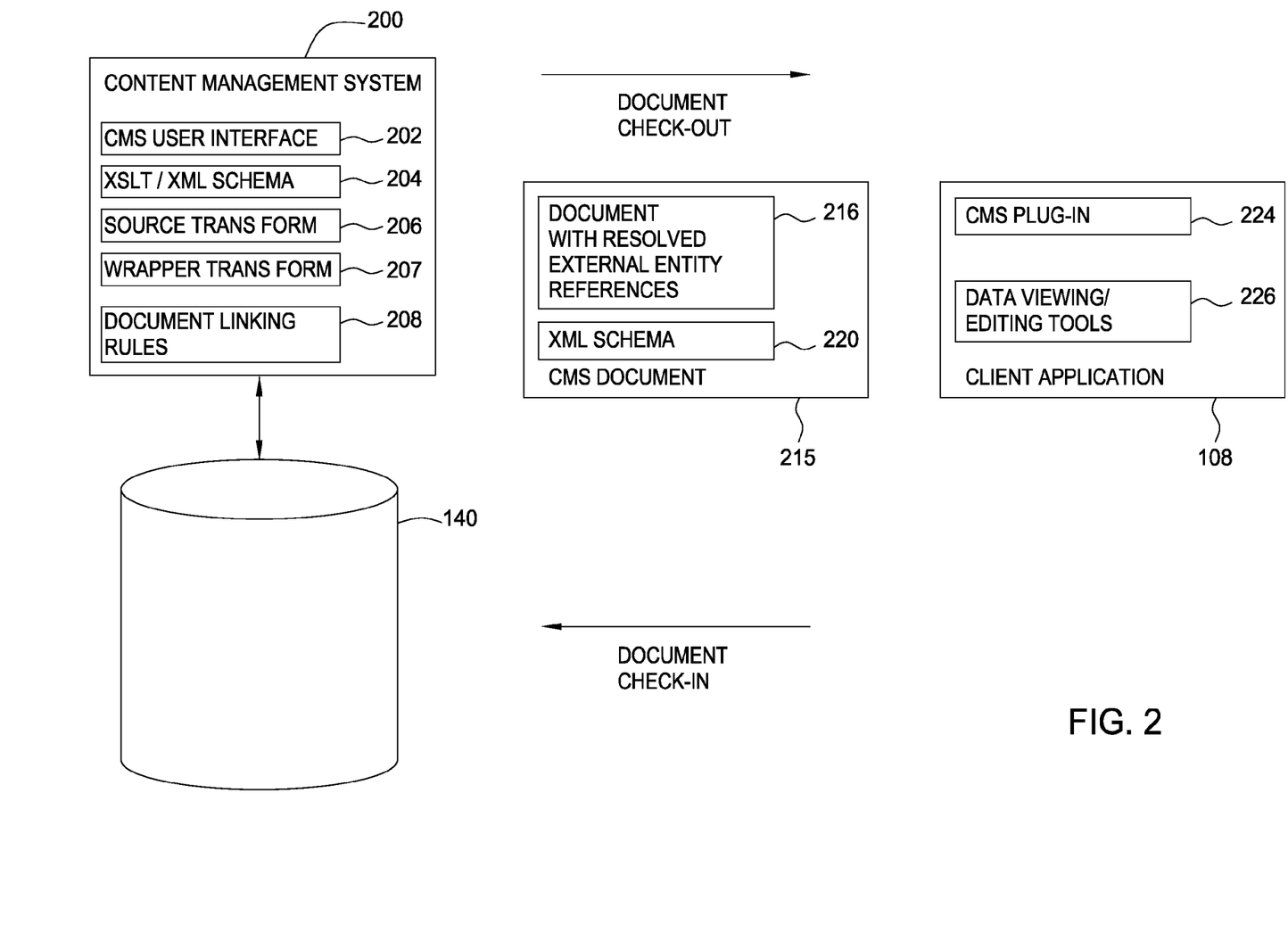
FIG. 2 is a block diagram illustrating a client application used to access data objects from a content management system, according to one embodiment of the invention.

FIG. 2 is a block diagram further illustrating components of a client application 108 used to access a document 215 from CMS 200, according to one embodiment of the invention. As shown, CMS 200 includes user interface 202, XML Schema 204, source transform 206, wrapper transform 207, and document linking rules 208. Those skilled in the art will recognize that the CMS 200 illustrated in FIG. 2 is simplified to highlight aspects of the present invention and that CMS systems typically include a variety of additional elements not shown in FIG. 2.

CMS 200 may perform several steps before providing content to a user interacting with client application 108. In one embodiment, after retrieving a requested document, CMS 200 may be configured to prepare the document for presentation to the user. For example, when a data object is marked up using XML, it may be transformed into HTML displayable by a web-browser. In one embodiment, a wrapper transform 207 may be applied to a source transform 206 before the source transform 206 is applied to the requested document. Both wrapper transform 207 and source transform 206 may be XSLT documents. By dynamically applying the wrapper transform 207 to the source transform 206, the source transform 206 may be modified so that it will produce an output document without any broken links or other unresolveable external entity references. Linking rules 208 may specify a mapping (e.g., a catalog or lookup table) used to generate a resolveable external entity reverences from a relative (or otherwise broken) reference that would otherwise be generated by applying source transform 206 to the requested document.

Further, by applying the wrapper transform 207, only a transient modification is made to the source transform 206. Once the wrapper transform 207 is applied to the source transform 206, the resulting modified source transform may be applied to the document being checked out to put it in the form expected by the client application 108 and data viewing/editing tools 226. Thus, users of CMS 200 may continue to use legacy or standards-based transforms, without having to directly modify or otherwise update source transform 206.

As shown, client application 108 includes CMS plug-in 224 and data viewing and editing tools 226. Editing tools 226 provide the substantive features associated with a particular client application. For example, a word processing application may provide tools for specifying document presentation style and content or a CAD application may include tools for creating precise three-dimensional digital models of real-world objects. Of course, depending on the particular client application 108, the exact features provided by viewing/editing tools 226 will vary. CMS plug-in 224 allows client application 108 to interact with CMS 200. For example, plug-in 224 may allow a user interacting with client application 108 to check-in and check-out documents from CMS 130, as well as to view and/or export documents from CMS 130.

FIG. 2 also shows document 215, which includes an XML document 216 and an associated XML schema/DTD 220. XML document 216 includes the data content manipulated by client application 108 and data viewing/editing tools 226. For example, the actual text of word processing document, or the contents of an eCTD transformed using transforms 206 and 207 into an HTML document that has resolvable external entity references (e.g., HTTP hyperlinks). XML schema/DTD 220 specifies which elements (markup tags) and attributes (values associated with specific tags) are allowed in a XML document conforming to the XML schema/DTD 220.

Figures 3A, 3B:
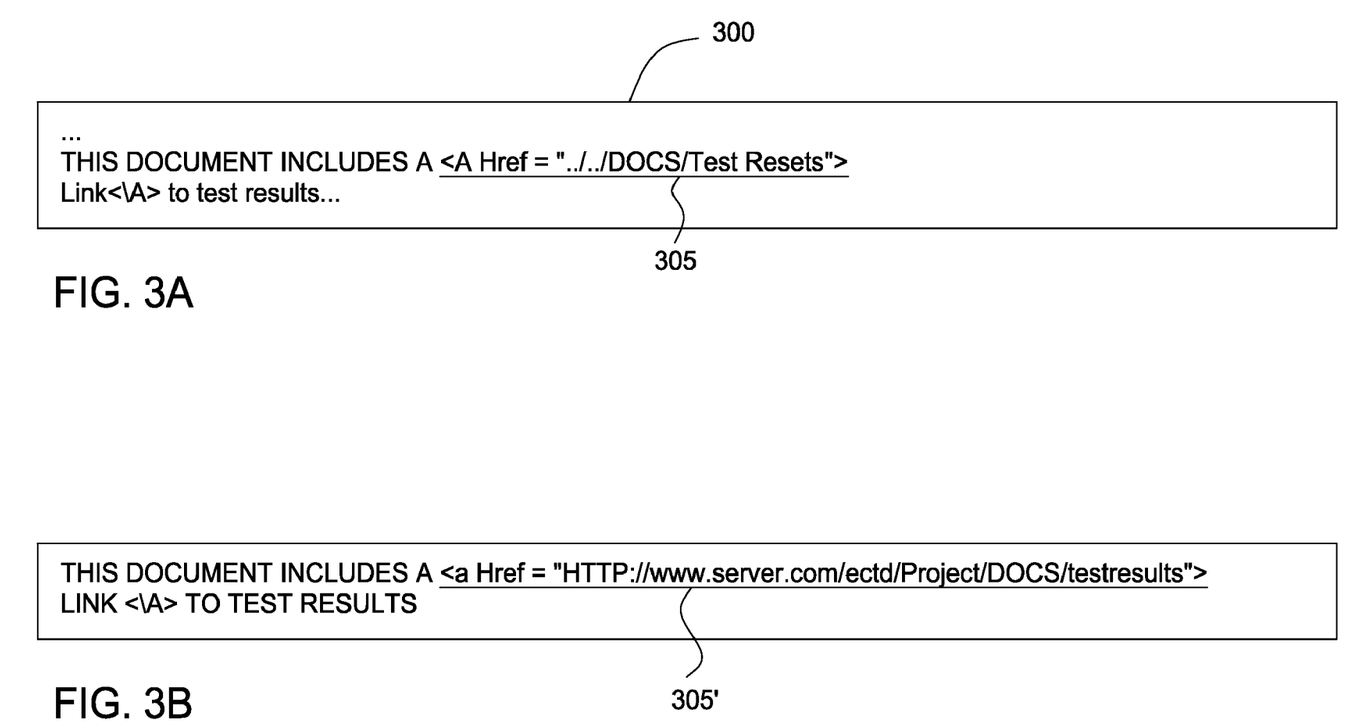
FIG. 3A illustrates an exemplary XML document stored by a content management system containing a broken link, according to one embodiment of the invention.
FIG. 3B illustrates the document from FIG. 3A containing a replacement link, according to one embodiment of the invention.

FIG. 3A shows a simplified example of a document containing markup content 300 as would be generated by source transform 206 where the transform is configured to generate an output document with local, or relative, external entity references. Illustratively, markup content 300 is composed in HTML and includes an anchor tag 305. The target of the anchor tag (i.e., the "href" attribute") points to a document in a relative location; namely, the location defined by the relative path of "../../docs/testresults."

FIG. 3B shows markup content 300' with link 305' replaced with a new link that includes a complete external reference (in this case a fully qualified URL). In one embodiment, link 305' results from applying the source wrapper transform to the source transform before it is applied to a document being accessed. As shown, the target of the anchor tag (i.e., the "href" attribute") now references a document in an absolute location; namely, the location defined by the path of "http://server.com/ectd/project1/docs/testresults." Thus, when markup content 300' is rendered by client application 108, the target of this reference may be resolved, and the corresponding document may be retrieved (should the user click on the link 305').

Figure 4A:
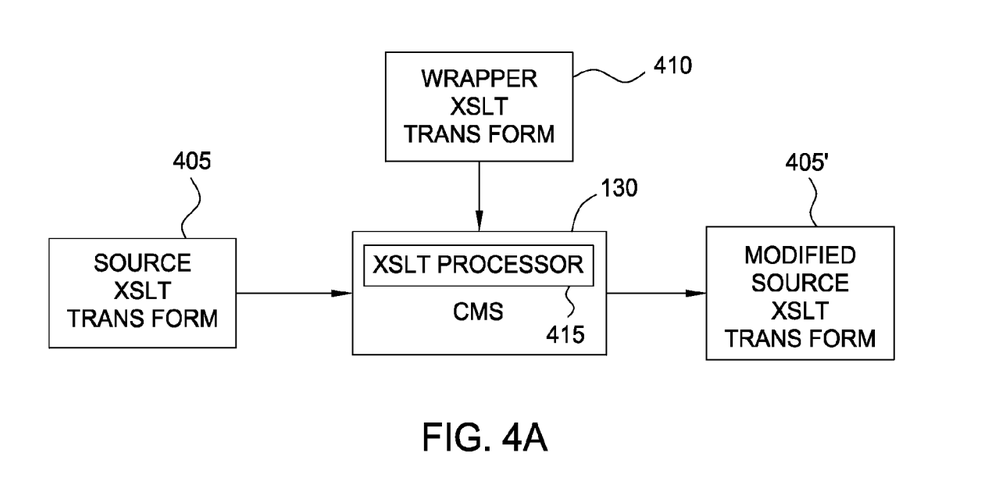
FIG. 4A is a block diagram illustrating the application of a wrapper XSLT transform to a source XSLT transform, according to one embodiment of the invention.

FIG. 4A is a block diagram showing the application of a wrapper XSLT transform 410 to a source XSLT transform 405, according to one embodiment of the invention. In one embodiment, the CMS includes an XSLT processor 415. As is known, an XSLT processor is an application generally configured to receive an input document and an XSLT transform and generate an output document from these inputs. Illustratively, XSLT processor 415 generates modified source transform 405' by applying wrapper XSLT transform 410 to source transform 405.

Figure 4B:
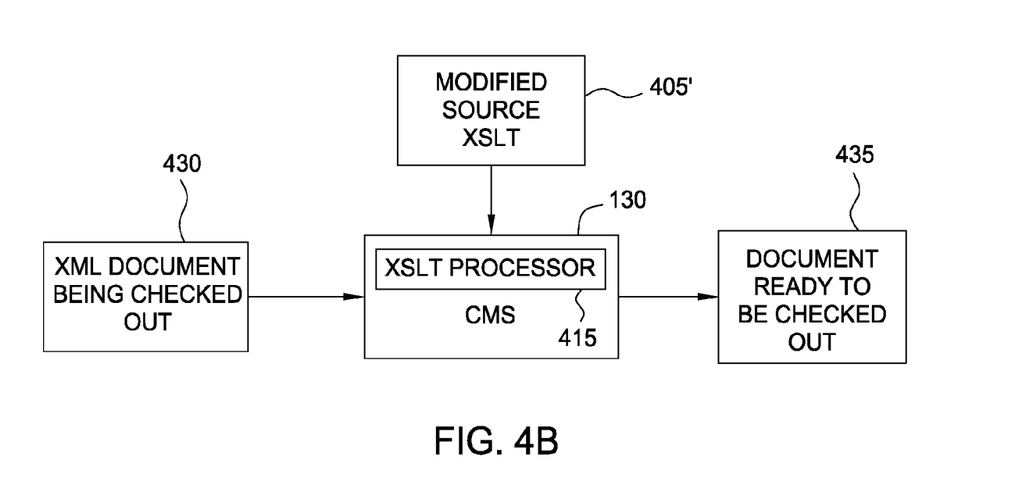
FIG. 4B is a block diagram illustrating the application of a modified source XSLT transform to an XML document being accessed, according to one embodiment of the invention.

FIG. 4B is a block diagram showing the application of the modified source XSLT 206' being applied to document 430 being accessed, according to one embodiment of the invention. Once the wrapper transform 410 is applied to the source transform 405, the resulting transform 405' many be applied the document 430. Accordingly, FIG. 4B shows the modified source transform 405' and document 430 being input to XSLT processor 415. This produces a document 435 ready to be transmitted for presentation and display by client application 108. In one embodiment, the document 430 generated by the XSLT processor 415 is an HTML document containing resolveable links for each external entity reference (e.g., the target for each hyperlink includes a fully qualified URL). Further, any number of wrapper transforms 410 may be applied, either alone in combination with one another.

Figure 5:
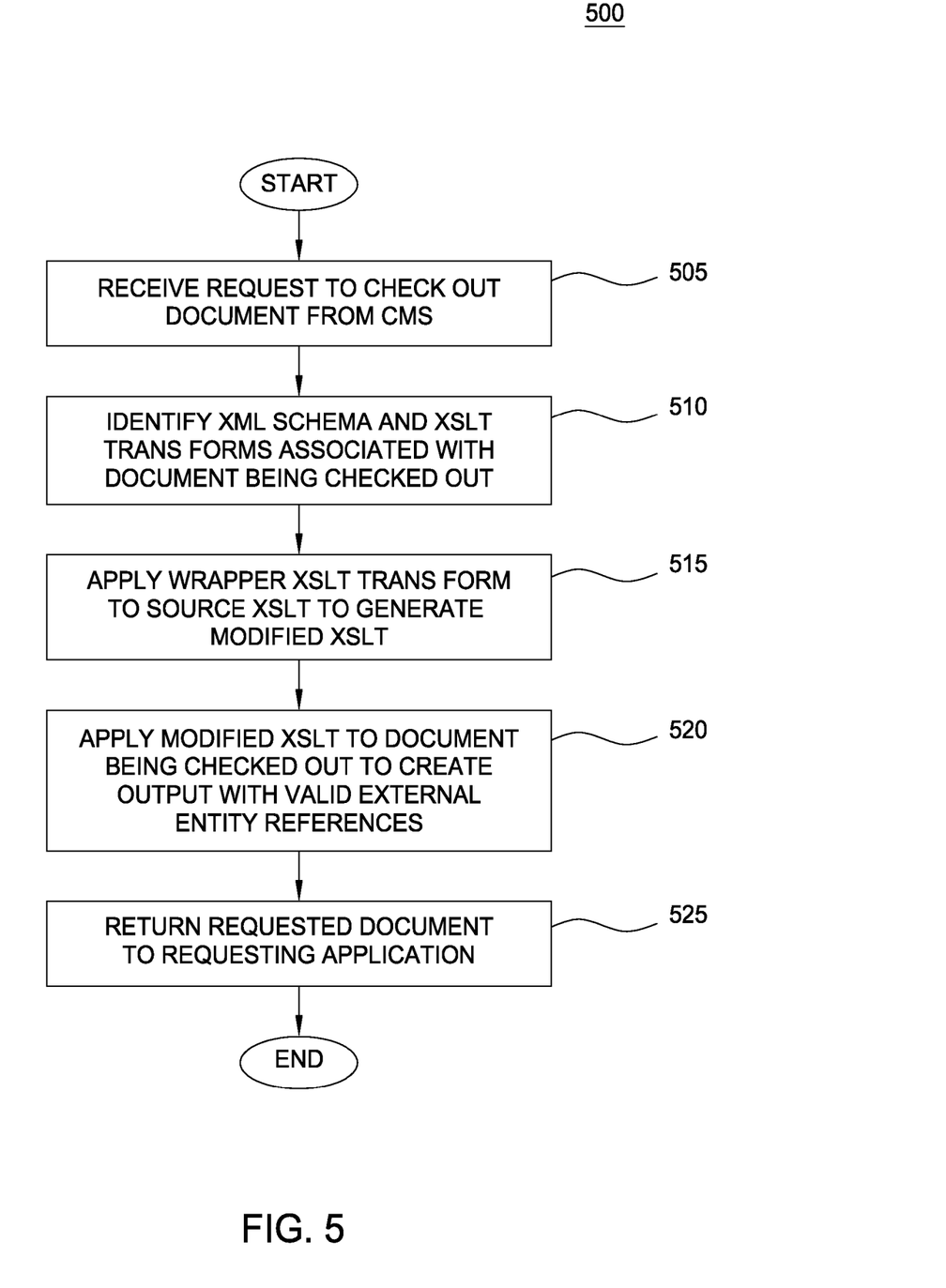
FIG. 5 illustrates a method for resolving links in data objects requested from a content management system, according to one embodiment of the invention.

FIG. 5 is a flow diagram illustrating a method 500 for a CMS to provide access to managed documents, according to one embodiment of the invention. The method 500 begins at step 505 where the CMS receives a request to access a document managed by CMS. For example, a user interacting with a client application 108 may request to check-out a document from CMS. At step 510, the CMS identifies the XML schemas and/or DTDs along with any source transforms 206 associated with the requested document. For example, the eCTD provides a standardized XML grammar along with a number of standardized source transforms used to generate HTML documents from components of the eCTD compound document backbone. In such a case, to generate an HTML document from the XML, the eCTD source transform may be used. As stated, however, when applied to an XML document, the standardized eCTD transforms may generate output HTML where the output links include relative paths or otherwise broken external entity references when the HTML is transmitted over a network to a remote user. In one embodiment, therefore, a wrapper transform 207 is used to modify the source transform 206 before it is applied to the requested document.

At step 515, wrapper transform 207 may be applied to the source transform 206 to generate modified source transform 206'. At step 520, after the source transform 206' is generated, the CMS may apply the modified transform 206' to the requested document. As stated, the result of these transforms is a document 435 ready to be accessed by the user, where the document includes valid external entity references. At step 525, the CMS may be configured to return the document requested at step 505 to the requesting application 108 for presentation and display to a user.

Figure 6:
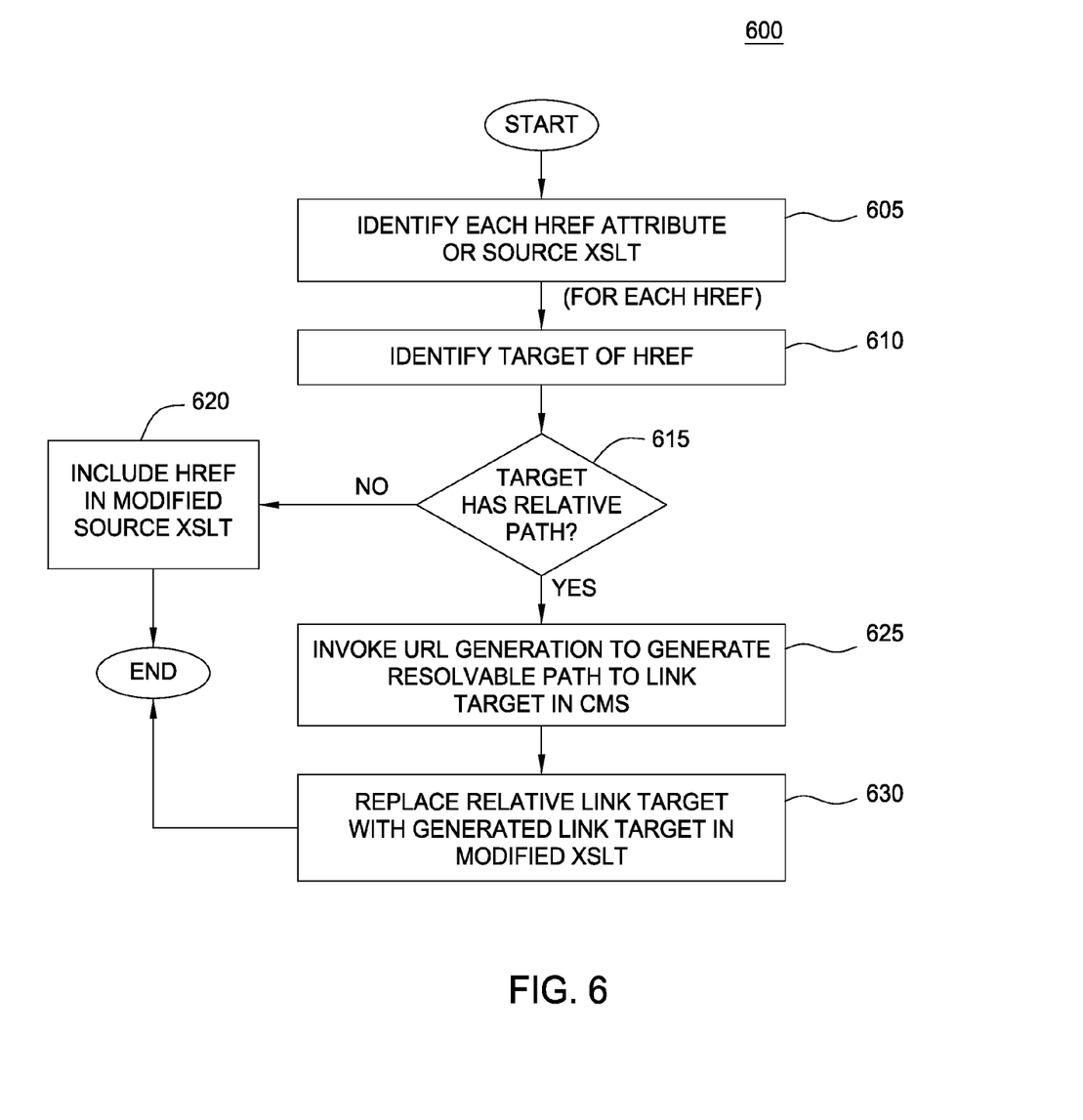
FIG. 6 illustrates a method for modifying a source transform using a wrapper transform, according to one embodiment of the invention.

FIG. 6 illustrates a method 600 for modifying a source transform using a wrapper transform, according to one embodiment of the invention. As stated, the source transform may be modified so that it will generate the resolvable external entity references when applied to a document. Illustratively, method 600 shows a process for replacing hyperlinks that include a relative target with fully qualified URLs. Of course, for other types of "broken" links, or other types of markup content, other steps may be performed.

The method 600 begins at step 605, where external entity references in the source transform 207 are identified. Using the example of an XSLT transform configured to generate HTML from a source XML document (e.g., the eCTD transforms), markup tags such as <href>, <img>, <imagemap>, or other external entity references may be identified. For other markup languages or grammars, external entity references may be identified by other markup tags or attributes.

As stated, the source transform may be modified by the wrapper transform so that the source transform generates URLs or other links for that may be resolveable by a client application 108. An example of this process is reflected in steps 610-630. At step 610, the target of any external entity reference may be identified. At step 615, the wrapper transform may determine whether the source transform will generate a relative path (e.g., "../../target.doc.") for an external entity reference. If so, then at step 625, the CMS may invoke a URL generation method to modify the source transform so that it will generate a fully qualified URL. In one embodiment, a catalog, or lookup table, may be used to generate the resolvable path to the target document in the CMS. For example, a catalog may contain a table of entries that contain fully qualified references to documents that may be the target of relative reference generated by the unmodified source transform.

At step 630, the relative link target may be replaced with the with the fully qualified link target. Otherwise, at step 620, the external entity reference may not need to be modified by the wrapper transform. After step 620 or 630, additional external entity references may be processed and the method 600 may loop back for another pass beginning at step 610. If there are no more external entity references to resolve, the method 600 terminates.

Once the wrapper transform has modified the source transform, the modified source transform may be applied to a document being accessed from the CMS. When so applied, the modified source transform generates an output document for delivery and presentation to the user, where the output document includes resolvable external entity references. For example, using a source transform 206 configured to generate HTML from an XML document, the modified source transform 206' may be used generate an HTML document where each external entity references (e.g., anchor <a> and image <img> tags) include hyperlink targets that may be resolved by client application 108. Further, the HTML document may be generated for a requesting client without directly modifying the source transform 206. Advantageously, this allows users to access documents from the CMS that are associated with an external standard (e.g., the eCTD standard) under a variety of conditions, without having to have full access to the complete eCTD backbone document and also without having to modify or maintain multiple versions of the standard's transforms.

While the foregoing is directed to embodiments of the present invention, other and further embodiments of the invention may be devised without departing from the basic scope thereof, and the scope thereof is determined by the claims that follow.

What is claimed is:

1. A method for providing dynamic external entity resolution in a content management system (CMS), comprising:
    receiving a request to access a document from the CMS, wherein the requested document is associated with at least one source transform configured to generate an output document with at least one relative reference to an external entity when the source transform is applied to the requested document;
    applying a wrapper transform to the source transform to generate a modified source transform, wherein the modified source transform is configured to generate an output document with resolvable external entity references when the modified source transform is applied to the requested document, wherein the source transform and the wrapper transform are XSLT transforms, and wherein applying the wrapper transform to the source transform comprises:
        identifying each external entity reference in the source transform,
        identifying a target of each external entity reference,
        upon determining the target is identified by a relative path, generating an absolute path describing a location the external entity reference, and
        replacing the relative path with the absolute path;
    applying the modified source transform to the requested document to generate the output document; and
    returning the output document to a requesting application.

2. The method of claim 1, wherein the requested document is an XML document, and wherein the source transform is configured to generate an HTML document from the XML document.

3. The method of claim 2, wherein the external entity reference is an anchor <a> tag or an image <img> tag with an href attribute specifying a relative path location for a target document.

4. The method of claim 1, wherein the modified source document is an HTML document which may be rendered by a browser, and wherein each external entity reference in the HTML document is an HTTP hyperlink referencing a URL resolvable by the requesting application.

5. The method of claim 1, wherein the request to access the document comprises one of a request to check out the document from the CMS, a request to view the document in the CMS, and a request to export the document from the CMS.

6. The method of claim 1, wherein transform to the source transform to generate a modified source transform, comprises:
    generating the absolute path describing the location referenced by the external entity reference comprises, invoking a URL generation method to generate a fully qualified URL; and
    wherein replacing the relative path with the absolute path comprises replacing the relative path with the fully qualified URL.

7. The method of claim 1, wherein the URL generation method determines a fully qualified URL for the relative path from a catalog mapping relative paths to resolvable fully qualified URLs.

8. The method of claim 1, wherein applying the wrapper transform to the source transform comprises sequentially applying a plurality of wrapper transforms.

9. A computer-readable storage medium containing a program which, when executed, performs an operation for providing dynamic external entity resolution in a content management system (CMS), comprising:
    receiving a request to access a document from the CMS, wherein the requested document is associated with at least one source transform configured to generate an output document with at least one relative reference to an external entity when the source transform is applied to the requested document;
    applying a wrapper transform to the source transform to generate a modified source transform, wherein the modified source transform is configured to generate an output document with resolvable external entity references when applied to the requested document, wherein the source transform and the wrapper transform are XSLT transforms, and wherein applying the wrapper transform to the source transform comprises:
        identifying each external entity reference in the source transform,
        identifying a target of each external entity reference,
        upon determining the target is identified by a relative path, generating an absolute path describing a location the external entity reference, and
        replacing the relative path with the absolute path;
    applying the modified source transform to the requested document being checked out to generate an output document; and
    returning the output document to a requesting application.

10. The computer-readable storage medium of claim 9, wherein the requested document being accessed is an XML document, and wherein the source transform is configured to generate an HTML document from the XML document.

11. The computer-readable storage medium of claim 10, wherein the external entity reference is an anchor <a> tag or an image <img> tag with an href attribute specifying a relative path location for a target document.

12. The computer-readable storage medium of claim 9, wherein the modified source document is an HTML document which may be rendered by a browser, and wherein each external entity reference in the HTML document is an HTTP hyperlink referencing a URL resolvable by the requesting application.

13. The computer-readable storage medium of claim 9, wherein the request to access the document comprises one of a request to check out the document from the CMS, a request to view the document in the CMS, and a request to export the document from the CMS.

14. The computer-readable storage medium of claim 9, wherein
generating the absolute path describing the location referenced by the external entity reference comprises, invoking a URL generation method to generate a fully qualified URL; and
wherein replacing the relative path with the absolute path comprises replacing the relative path with the fully qualified URL.

15. The computer-readable storage medium of claim 14, wherein the URL generation method determines a fully qualified URL for the relative path from a catalog mapping relative paths to resolvable document locations in the CMS.

16. The computer-readable storage medium of claim 9, wherein applying the wrapper transform to the source transform comprises sequentially applying a plurality of wrapper transforms.

17. A system, comprising:
a processor; and
a memory containing a content management system (CMS) configured to perform a method for providing dynamic external entity resolution, including performing the steps of:
receiving a request to access a document from the CMS, wherein the requested document is associated with at least one source transform configured to generate an output document with at least one relative reference to an external entity when the source transform is applied to the requested document,
applying a wrapper transform to the source transform to generate a modified source transform, wherein the modified source transform is configured to generate an output document with resolvable external entity references when applied to the requested document, wherein the source transform and the wrapper transform are XSLT transforms, and wherein applying the wrapper transform to the source transform comprises:
identifying each external entity reference in the source transform;
identifying a target of each external entity reference;
upon determining the target is identified by a relative path, generating an absolute path describing a location the external entity reference; and
replacing the relative path with the absolute path,
applying the modified source transform to the requested document to generate an output document, and
returning the output document to a requesting application.

18. The system of claim 17, wherein the document being accessed is an XML document, and wherein the source transform is configured to generate an HTML document from the XML document.

19. The system of claim 17, wherein
generating the absolute path describing the location referenced by the external entity reference comprises, invoking a URL generation method to generate a fully qualified URL, and
wherein replacing the relative path with the absolute path comprises replacing the relative path with the fully qualified URL.

20. The system of claim 17, wherein the request to access the document comprises one of a request to check out the document from the CMS, a request to view the document in the CMS, and a request to export the document from the CMS.

* * * * *